US 12,352,585 B2

(12) United States Patent
Feng

(10) Patent No.: US 12,352,585 B2
(45) Date of Patent: Jul. 8, 2025

(54) PARK-AND-RIDE ROUTE GENERATION METHOD, SYSTEM, DEVICE, AND MEDIUM

(71) Applicant: SUZHOU UNIVERSITY OF SCIENCE AND TECHNOLOGY, Jiangsu (CN)

(72) Inventor: Yan Feng, Jiangsu (CN)

(73) Assignee: SUZHOU UNIVERSITY OF SCIENCE AND TECHNOLOGY, Suzhou (CN)

( * ) Notice: Subject to any disclaimer, the term of this patent is extended or adjusted under 35 U.S.C. 154(b) by 0 days.

(21) Appl. No.: 18/954,634

(22) Filed: Nov. 21, 2024

(65) Prior Publication Data

US 2025/0164254 A1    May 22, 2025

(30) Foreign Application Priority Data

Nov. 21, 2023  (CN) .......................... 202311552258.8
Oct. 29, 2024  (CN) .......................... 202411523567.7

(51) Int. Cl.
G01C 21/34    (2006.01)
(52) U.S. Cl.
CPC .............................. G01C 21/3423 (2013.01)
(58) Field of Classification Search
None
See application file for complete search history.

(56) References Cited

U.S. PATENT DOCUMENTS

2020/0191587 A1* 6/2020 Fuchs ..................... G06Q 50/40
2022/0018667 A1* 1/2022 Al-Dujaili .......... G01C 21/3423

FOREIGN PATENT DOCUMENTS

| CN | 104776850 A |   | 7/2015 |
| CN | 104977008 A |   | 10/2015 |
| CN | 105760960 A | * | 7/2016 |
| CN | 110220511 A |   | 9/2019 |
| CN | 112129306 A | * | 12/2020 |

(Continued)

OTHER PUBLICATIONS

Yan Feng et al., Research on Path Analysis Algorithms in Multi-type Transportation Systems, Eighth Annual Conference of the China Geographic Information System Association (CGISA), Nov. 30, 2004, pp. 59-63.

(Continued)

*Primary Examiner* — Khoi H Tran
*Assistant Examiner* — Dairon Estevez

(57) ABSTRACT

The present disclosure discloses a park-and-ride route generation method, a system, a device, and a medium. The method comprises: expanding an expanded network node from a starting position to a destination position in the constructed topological relationship between a roadway network and a public transportation network; obtaining, by using a multivariate heuristic function, a minimum cost value from the starting position to the destination position via the expanded network node; and generating a park-and-ride route from the starting position to the destination position according to the minimum cost value. The present disclosure realizes the self-adaptive switching between the roadway network and the public transportation network at the P&R parking lot, and meets the demand for hybrid travel mode involving the roadway network and the public transportation network.

10 Claims, 6 Drawing Sheets

(56) References Cited

FOREIGN PATENT DOCUMENTS

| | | | |
|---|---|---|---|
| CN | 113514071 A | | 10/2021 |
| CN | 113758496 A | * | 12/2021 |
| CN | 115127569 A | | 9/2022 |
| JP | 2008128779 A | * | 6/2008 |
| KR | 20080059867 A | | 7/2008 |

OTHER PUBLICATIONS

Jun. 21, 2024 1st Chinese Office Action issued in Chinese Patent Application No. 202311552258.8.
Aug. 22, 2024 2nd Chinese Office Action issued in Chinese Patent Application No. 202311552258.8.
Jun. 21, 2024 Chinese First Search Report issued in Chinese Patent Application No. 202311552258.8.
Aug. 19, 2024 Supplementary Chinese Search Report issued in Chinese Patent Application No. 202311552258.8.
Sep. 18, 2024 Supplementary Chinese Search Report issued in Chinese Patent Application No. 202311552258.8.
Sep. 26, 2024 Notice of Allowance issued in Chinese Patent Application No. 202311552258.8.

* cited by examiner

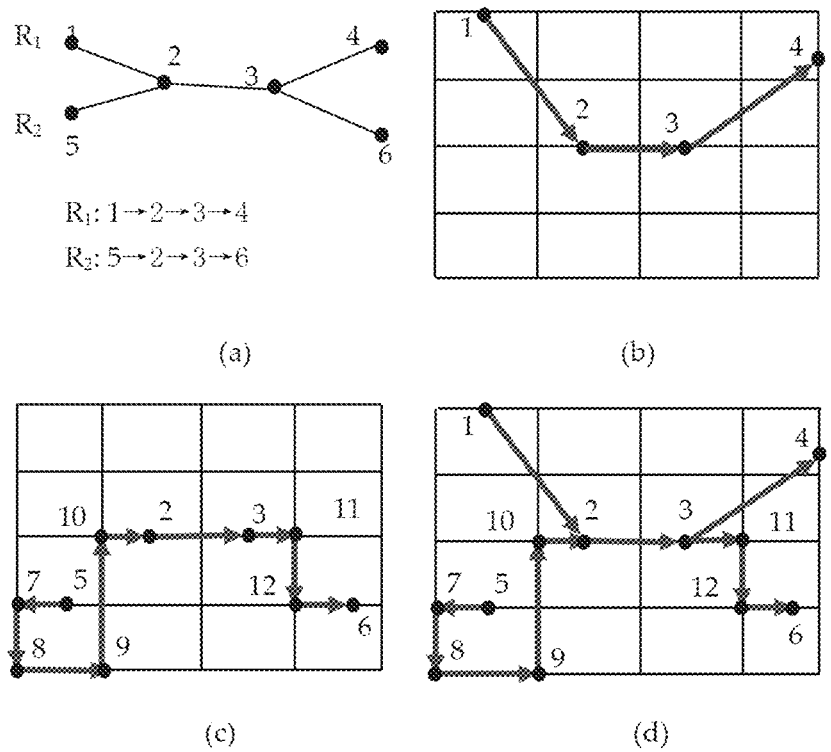
FIG. 2
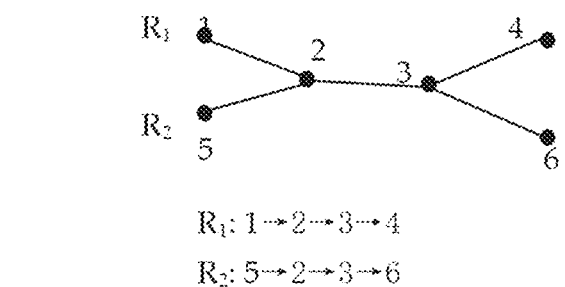
FIG. 3
$$T = \begin{bmatrix} 0 & 1 & 1 & 1 & 0 & 0 \\ 0 & 0 & 2 & 1 & 0 & 1 \\ 0 & 0 & 0 & 1 & 0 & 1 \\ 0 & 0 & 0 & 0 & 0 & 0 \\ 0 & 1 & 1 & 0 & 0 & 1 \\ 0 & 0 & 0 & 0 & 0 & 0 \end{bmatrix} \quad T^2 = \begin{bmatrix} 0 & 1 & 2 & 2 & 0 & 2 \\ 0 & 0 & 0 & 2 & 0 & 2 \\ 0 & 0 & 0 & 0 & 0 & 0 \\ 0 & 0 & 0 & 0 & 0 & 0 \\ 0 & 0 & 2 & 2 & 0 & 2 \\ 0 & 0 & 0 & 0 & 0 & 0 \end{bmatrix}$$
FIG. 4

$$Q = \begin{bmatrix} 0 & 1 & 1 & 1 & 0 & 2 & 0 & 0 & 0 & 0 & 3 & 3 \\ 0 & 0 & 1 & 1 & 0 & 1 & 0 & 0 & 0 & 0 & 2 & 2 \\ 0 & 0 & 0 & 1 & 0 & 1 & 0 & 0 & 0 & 0 & 2 & 2 \\ 0 & 0 & 0 & 0 & 0 & 0 & 0 & 0 & 0 & 0 & 0 & 0 \\ 0 & 1 & 1 & 2 & 0 & 1 & 2 & 2 & 2 & 2 & 2 & 2 \\ 0 & 0 & 0 & 0 & 0 & 0 & 0 & 0 & 0 & 0 & 0 & 0 \\ 0 & 2 & 2 & 3 & 0 & 2 & 0 & 1 & 1 & 1 & 1 & 1 \\ 0 & 2 & 2 & 3 & 0 & 2 & 1 & 0 & 1 & 1 & 1 & 1 \\ 0 & 2 & 2 & 3 & 0 & 2 & 1 & 1 & 0 & 1 & 1 & 1 \\ 0 & 2 & 2 & 3 & 0 & 2 & 1 & 1 & 1 & 0 & 1 & 1 \\ 0 & 0 & 0 & 0 & 0 & 2 & 1 & 1 & 1 & 1 & 0 & 1 \\ 0 & 0 & 0 & 0 & 0 & 2 & 1 & 1 & 1 & 1 & 1 & 0 \end{bmatrix}$$

PARK-AND-RIDE ROUTE GENERATION METHOD, SYSTEM, DEVICE, AND MEDIUM

CROSS-REFERENCE TO RELATED APPLICATIONS

The present application claims the benefit of Chinese Patent Application No. 202311552258.8 filed on Nov. 21, 2023, and Chinese Patent Application No. 202411523567.7 filed on Oct. 29, 2024, the contents of which are incorporated herein by reference in their entirety.

TECHNICAL FIELD

The present disclosure relates to the technical field of transportation, and in particular to a park-and-ride route generation method, a system, a device, and a medium.

BACKGROUND

In the modern urban transportation system, people's choices of travel modes are becoming more and more diverse. In addition to private cars and taxis, there are also various travel modes of public transportation, such as metro, buses, tourist lines, ferries, etc. In addition, with the promotion of P&R (Park and $R_1$ de parking lot) park-and-ride mode, the mixed mode of transportation, combining driving and public transit, is becoming more and more popular among travelers. Coupled with the gradual popularity of shared bicycles in recent years, it provides more choices for people's travel modes. Faced with such a complex transportation service network and numerous travel options, it is generally not easy for travelers to find a relatively reasonable travel plan. Currently, existing path analysis algorithms mostly solve the problem of a single transportation network path analysis, for example, for the travel plan of driving in a road network, and most commonly, various navigation software algorithms used for driving; in addition, the algorithms solve the problem of public transportation travel plans and provide travelers with travel plans between metro and buses. However, none of these algorithms solves the problem of self-adaptive switching between a road network and a public transportation network when stopping at the P&R parking lot, that is, they cannot provide travelers with a combined travel plan of driving and public transportation when stopping at the P&R parking lot. With the continuous expansion of cities, there are more and more P&R parking lots in cities, which provide great convenience for travelers living in suburban areas and working in urban areas; in addition, travelers who drive from surrounding cities to major urban areas can also make full use of the convenience of P&R parking lots. In modern urban transportation systems, a single transportation network path analysis algorithm can no longer meet the demand.

BRIEF SUMMARY OF THE INVENTION

The technical problem to be solved by the present disclosure is to overcome the defect that the transportation travel plan in the prior art cannot solve the self-adaptive switching between a public transportation network and a road network when stopping at a P&R parking lot, and to provide a park-and-ride route generation method, a system, a device, and a medium.

The present disclosure solves the above technical problems through the following technical solutions:

A first aspect of the present disclosure provides a park-and-ride route generation method, comprising:
  constructing a topological relationship between a roadway network and a public transportation network;
  expanding an expanded network node from a starting position to a destination position in the topological relationship;
  obtaining, by using a multivariate heuristic function, a minimum cost value from the starting position to the destination position via the expanded network node;
  generating a park-and-ride route from the starting position to the destination position according to the minimum cost value.

Preferably, the step of constructing a topological relationship between a roadway network and a public transportation network comprises:
  obtaining public transportation network data and roadway network data;
  constructing the topological relationship between the roadway network and the public transportation network according to the public transportation network data and the roadway network data.

Preferably, after the step of generating a park-and-ride route from the starting position to the destination position according to the minimum cost value, the generation method further comprises:
  obtaining the number of transfers and/or a travel time and/or a travel cost and/or a walking distance in the park-and-ride route;
  prioritizing the park-and-ride route according to the number of transfers and/or the travel time and/or the travel cost and/or the walking distance.

Preferably, the step of generating a park-and-ride route from the starting position to the destination position according to the minimum cost value comprises:
  obtaining an adjacent network node adjacent to the expanded network node;
  determining whether the adjacent network node overlaps with a node in network nodes to be expanded, and if so, replacing the overlapped network node with the adjacent network node; if not, recording the adjacent network node into the network nodes to be expanded;
  determining whether the expanded network node is a destination position, and if so, generating a park-and-ride route from the starting position to the expanded network node according to the adjacent network node; if not, generating a park-and-ride route from the starting position to the expanded network node and from the expanded network node to the destination position according to the adjacent network node, so as to obtain the park-and-ride route from the starting position to the destination position;
  and/or,
  the expanded network node comprises at least one of a road intersection, a public transportation station, a metro station, and a parking lot.

A second aspect of the present disclosure provides a park-and-ride route generation system, comprising:
  a construction module, configured to construct a topological relationship between a roadway network and a public transportation network;
  an expansion module, configured to expand an expanded network node from a starting position to a destination position in the topological relationship;
  a first obtaining module, configured to obtain, by using a multivariate heuristic function, a minimum cost value from the starting position to the destination position via the expanded network node;

a first generation module, configured to generate a park-and-ride route from the starting position to the destination position according to the minimum cost value.

Preferably, the construction module comprises:

a first obtaining unit, configured to obtain public transportation network data and roadway network data;

a construction unit, configured to construct the topological relationship between the roadway network and the public transportation network according to the public transportation network data and the roadway network data.

Preferably, the generation system further comprises:

a second obtaining module, configured to obtain the number of transfers and/or a travel time and/or a travel cost and/or a walking distance in the park-and-ride route;

a sorting module, configured to prioritize the park-and-ride route according to the number of transfers and/or the travel time and/or the travel cost and/or the walking distance.

Preferably, the first generation module comprises:

a second obtaining unit, configured to obtain an adjacent network node adjacent to the expanded network node;

a first determining unit, configured to determine whether the adjacent network node overlaps with a node in network nodes to be expanded, and if so, to invoke a replacement unit; if not, to invoke a recording unit;

the replacement unit, configured to replace the overlapped network node with the adjacent network node;

the recording unit, configured to record the adjacent network node into the network nodes to be expanded;

a second determining unit, configured to determine whether the expanded network node is a destination position, and if so, to invoke a first generation unit; if not, to invoke a second generation unit;

the first generation unit, configured to generate a park-and-ride route from the starting position to the expanded network node according to the adjacent network node;

the second generation unit, configured to generate a park-and-ride route from the starting position to the expanded network node and from the expanded network node to the destination position according to the adjacent network node, so as to obtain the park-and-ride route from the starting position to the destination position;

and/or, the expanded network node comprises at least one of a road intersection, a public transportation station, a metro station, and a parking lot.

A third aspect of the present disclosure provides an electronic device, comprising a memory, a processor, and a computer program stored in the memory and configured to run on the processor, wherein the processor, when executing the computer program, implements the park-and-ride route generation method as described in the first aspect.

A fourth aspect of the present disclosure provides a computer-readable storage medium on which a computer program is stored, wherein the computer program, when executed by a processor, implements the park-and-ride route generation method as described in the first aspect.

On the basis of common sense in the art, the above preferred conditions can be combined arbitrarily to obtain preferred examples of the present disclosure.

The positive and progressive effects of the present disclosure are:

The present disclosure expands the expanded network node between the starting position and the destination position in the constructed topological relationship between the roadway network and the public transportation network; generates the park-and-ride route from the starting position to the destination position according to the minimum cost value, obtained by using the multivariate heuristic function, from the starting position to the destination position via the expanded network node; realizing the self-adaptive switching between the roadway network and the public transportation line network at the P&R parking lot, and meeting the demand for hybrid travel mode involving the roadway network and public transportation line network.

BRIEF DESCRIPTION OF THE DRAWINGS

FIG. 2 is a schematic diagram of a metro line network and a bus line network in Examples 1 and 2 of the present disclosure.

FIG. 3 is a schematic diagram of a public transportation network in Examples 1 and 2 of the present disclosure.

FIG. 4 is a schematic diagram of the adjacency matrix of the public transportation network in Examples 1 and 2 of the present disclosure.

FIG. 7 is a partial schematic diagram of the transfer matrix in Examples 1 and 2 of the present disclosure.

DETAILED DESCRIPTION OF THE INVENTION

The present disclosure is further illustrated by the embodiments below, but is not limited to the scope of the described embodiments.

Example 1

Figure 1:
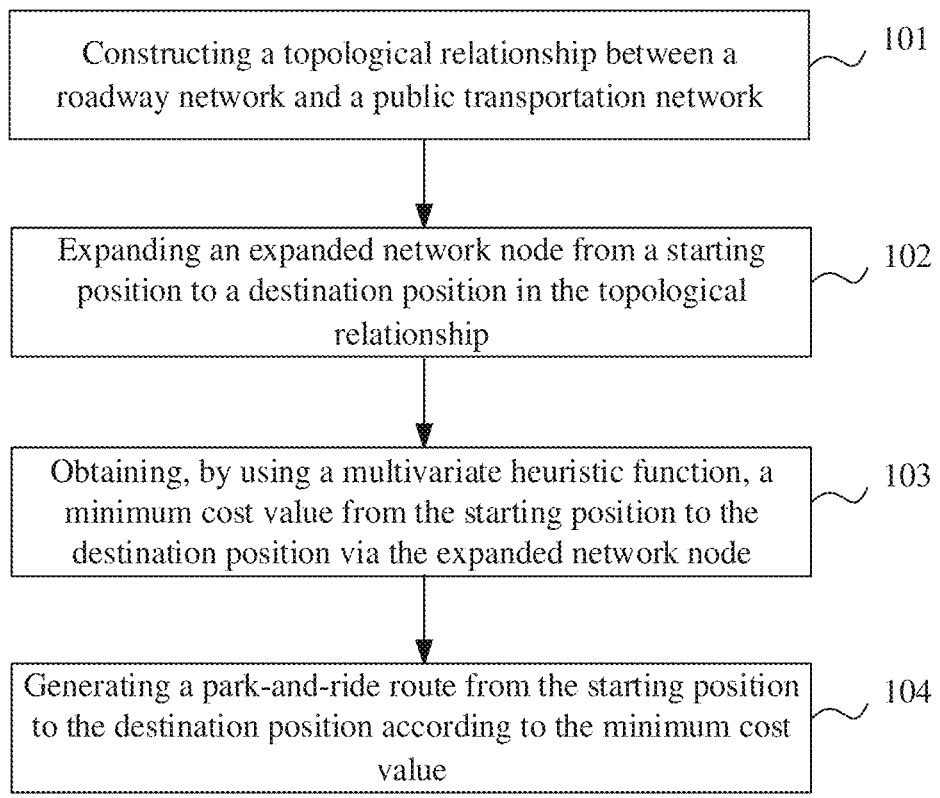
FIG. 1 is a flowchart of a park-and-ride route generation method in Example 1 of the present disclosure.

This example provides a park-and-ride route generation method, as shown in FIG. 1. The generation method comprises:

Step 101: constructing a topological relationship between a roadway network and a public transportation network.

Step 102: expanding an expanded network node from a starting position to a destination position in the topological relationship.

In an optional embodiment, the expanded network node comprises at least one of a road intersection, a public transportation station, a metro station, and a parking lot.

Step 103: obtaining, by using a multivariate heuristic function, a minimum cost value from the starting position to the destination position via the expanded network node.

In this example, when a park-and-ride route is searched, whenever a network node is expanded, a network node with a minimum cost value F(N) is always selected from all the network nodes to be expanded as an expansion object, so as to enable the search to be performed in a most promising direction as much as possible. The following formula (1) is an expression of F(N):

$$F(N) = G(N) + H(N) \quad (1)$$

where F(N) represents the minimum cost value; G(N) represents the route cost paid from a starting position O to any point N; H(N) represents the transfer cost value required for any point N to reach a destination position D.

The expression of H(N) is as shown in formula (2):

$$H(N) = \begin{cases} D_{nd} \\ Q_{nd} \\ T_{nd} \\ C_{nd} \end{cases} \quad (2)$$

In the formula (2), $D_{nd}$ represents the distance from any point N to the destination position D, $Q_{nd}$ represents the number of transfers required from any point N to the destination position D, $T_{nd}$ represents the time required from any point N to the destination position D, and $C_{nd}$ represents the cost required from any point N to the destination position D.

Step 104: generating a park-and-ride route from the starting position to the destination position according to the minimum cost value.

In the specific implementation process, starting from the starting position, the neighboring network nodes around the starting position are traversed first. Then, the neighboring network nodes of the network nodes that have already been traversed (i.e., in the expanded network node array) are traversed, gradually expanding outward. The criterion for node expansion is the minimum cost of the multivariate heuristic function. The evaluation standard of the cost is determined according to the priority of each evaluation indicator in the multivariate heuristic function. The process continues until the destination position is reached. When the traversed expanded network node is a P&R parking lot, self-adaptive switching is performed based on the multivariate heuristic function, and traversal continues in sequence until the termination condition is met.

In this example, the cost value of the multivariate heuristic function is dynamically calculated based on the expanded state of the expanded network nodes. Each time an expanded network node is traversed, the multivariate heuristic function of the expanded network node needs to be calculated to estimate the optimal route cost value F(N) through the expanded network node to the target network node under the constraints of the starting position. Whenever a network node is expanded, a network node with a minimum cost value F(N) is always selected from all the network nodes to be expanded as an expansion object, so as to enable the search to be performed in a most promising direction as much as possible. Therefore, each time the network node is expanded, the network node with the smallest F(N) value is always selected from the array of network nodes to be expanded (ExNodes) for expansion, enabling the search to be performed along the optimal path as much as possible.

During the search process, eligible expanded network nodes are added to the array ExNodes until they are expanded to the destination position D, marking the end of the search process. It should be noted that the algorithm for the park-and-ride route in this example only requires some of the network nodes and their relationships in the entire state space of the problem to solve the problem. Therefore, compared to other algorithms, it has higher search efficiency.

In addition, travel time and travel cost of public transportation between any two stations can be easily obtained, and the travel time, the travel cost, and the transfer matrix between the above any two stations can be pre-processed and generated in batches during initialization, thereby greatly optimizing the execution efficiency of the algorithm. Walking distance is not included in the multivariate heuristic function, and it is mainly considered that the walking distance needs to be calculated in real time in the road network according to different starting and destination positions, which will affect the execution efficiency of the algorithm. In this example, walking distance is used as a sorting condition to prioritize the searched transfer routes.

This example generates the park-and-ride route from the starting position to the destination position according to the minimum cost value, obtained by using the multivariate heuristic function, from the starting position to the destination position via the expanded network node; realizing the self-adaptive switching between the roadway network and the public transportation line network through the P&R parking lot, minimizing the cost from the starting position to the destination position, solving the problem of self-adaptive searching for the optimal and most comfortable (minimal cost) travel line via the P&R parking lot, meeting the demand for hybrid travel mode involving the roadway network and public transportation line network, and aligning with the principles of low-carbon travel. Especially for megacities, it helps users find a reasonable and optimal travel route in complex urban transportation systems.

In an optional embodiment, step 101 comprises:
step 101-1: obtaining public transportation network data and roadway network data;
step 100-2: constructing the topological relationship between the roadway network and the public transportation network according to the public transportation network data and the roadway network data.

In this example, in the urban hybrid transportation network, the expanded network node comprises at least one of the road intersection, the public transportation station, the metro station, and the parking lot. The connections between nodes are edges in the hybrid transportation network. First, the topological relationship between the roadway network and the public transportation network is established based on mathematical principles and network connectivity rules, that is, the spatial relationships between nodes and nodes, nodes and edges, and edges and edges are established, and the connection relationship between the roadway network and the public transportation network is established through P&R parking lot points.

In this example, although the public transportation network and the roadway transportation network are two independent network systems where the transportation vehicles operate in an orderly manner within their respective networks without interference, there is a topological relationship between the two networks. For example, although buses have fixed operating lines, these operating lines are built based on the roadway network. FIG. 2 is a schematic diagram of a metro line network and a bus line network. As shown in FIG. 2(a), the metro line $R_1$ (1→2→3→4) and the bus line $R_2$ (5→2→3→6) are illustrated. Among them, the metro line network is a constrained network. Since metro vehicles do not operate on the road, there is no topological relationship between the constrained network and the road centerline network. The only topological relationship exists between the metro stations and the road network, that is, the metro stations are located on the centerline of the road network, as shown in FIG. 2(b). The bus line is also a constrained network, but the buses in the constrained network actually operate on the road. Therefore, there is a strong topological relationship between the bus line network and the road network. As shown in FIG. 2(c), the bus line consists of the entire or partial boundaries of many road centerlines. The line $R_2$ (5→6) consists of road centerlines E5,7, E7,8, E8,9, E9,10, E10,2, E2,3, E3,11, E11, 12, and E12,6. The topological relationship between the two constrained networks and the road network is shown in FIG. 2(d). It should be noted that regardless of the mode of transportation, travelers will travel along the urban road transportation network.

Specifically, FIG. 3 shows a public transportation network composed of two lines, $R_1$ and $R_2$, in which network nodes 1 to 6 represent stations, and the edges in the network are the connections between two stations. Each line has a predefined line direction, and there may be one or more common stations between the lines.

For public transportation networks, in network analysis, an adjacency matrix is used to express the connectivity between nodes in the network. Connectivity between stations can be expressed by an adjacency matrix. The element $T_{ij}$=k in the matrix represents that there are k service lines connecting station i to station j. The diagonal element $T_{ii}$ is 0. The adjacency matrix for stations 1 to 6 in FIG. 3 is shown in FIG. 4. For example, there are two lines, $R_1$ and $R_2$, connecting station 2 to station 3, so $T_{23}$=2. The weighted matrix $T_{ij}^n$=k of the adjacency matrix T indicates that there are k service schemes from station i to station j with n−1 transfers. For example, $T_{24}^2$=4 means that there are two service schemes from station 2 to station 4 with one transfer: $R_1$ (2→3) followed by $R_1$ (3→4); $R_2$ (2→3) followed by $R_1$ (3→4). Although switching for the same vehicle is almost impossible to happen in practice, theoretically, such a situation does exist. Based on the above conclusion, the minimum number of transfers between any two points in the public transportation network can be calculated using the adjacency matrix and its weighted matrix. In other words, the matrix formed by the n-th power of the weighted adjacency matrix is referred to as the transfer frequency matrix.

Figures 5, 6:
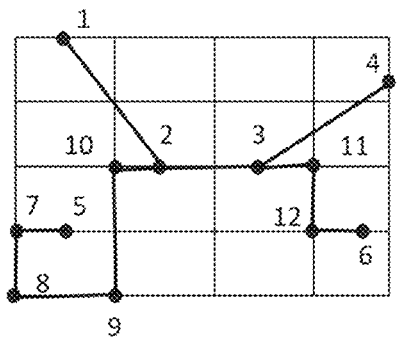
FIG. 5 is a schematic diagram of a hybrid transportation network in Examples 1 and 2 of the present disclosure.
FIG. 6 is a schematic diagram of a transfer matrix in Examples 1 and 2 of the present disclosure.

The above is the analysis for the public transportation network. For a hybrid network, when calculating the transfer frequency matrix, in addition to considering the adjacency matrix and its weighted matrix, the network node type also needs to be taken into account. The algorithm for calculating the transfer frequency matrix of the hybrid network differs from the previous method. FIG. 5 shows a schematic diagram of an urban hybrid transportation network where the topological relationship between the public transportation network (shown in FIG. 3) and the roadway network has been established. The expanded network nodes 7 to 12 are road intersections located on the roads. In network analysis, both road intersections and bus stations are regarded as nodes in the network, and the topological connectivity is consistent. However, in practice, there must be at least one transfer between road intersections and bus stations. Based on this theory, the steps for calculating the transfer frequency matrix of the hybrid network are as follows:

1. establishing an adjacency matrix T between nodes and setting all elements of the transfer frequency matrix Q to zero;
2. calculating the weighted matrix $T^n$ of the adjacency matrix (where n starts from 1 and is incremented sequentially);
3. comparing $Q_{ij}$ and $T_{ij}$ in order; if $Q_{ij}$=0 and $T_{ij}^n$≠0, setting $Q_{ij}$=n;
4. determining the types of nodes i and j; if both are road intersections or both are public transportation stations, setting $Q_{ij}$=n; otherwise, setting $Q_{ij}$=n+1;
5. repeating steps 2 and 3 until all elements in Q, except the diagonal elements, are non-zero, and ending the loop.

FIG. 6 shows the transfer frequency matrix from node 1 to node 12, where the diagonal elements and the elements between two points that cannot be reached through any number of transfers are set to 0.

In an optional embodiment, after step 104, the generation method further comprises:
   step 105: obtaining the number of transfers and/or a travel time and/or a travel cost and/or a walking distance in the park-and-ride route;
   step 106: prioritizing the park-and-ride route according to the number of transfers and/or the travel time and/or the travel cost and/or the walking distance.

In an optional embodiment, step 104 comprises:
   step 104-1: obtaining an adjacent network node adjacent to the expanded network node;
   step 104-2: determining whether the adjacent network node overlaps with a node in network nodes to be expanded, and if so, executing step 104-3; if not, executing step 104-4;
   step 104-3: replacing the overlapped network node with the adjacent network node;
   step 104-4: recording the adjacent network node into the network nodes to be expanded;
   step 104-5: determining whether the expanded network node is the destination position, and if so, executing step 104-6; if not, executing step 104-7;
   step 104-6: generating a park-and-ride route from the starting position to the expanded network node according to the adjacent network node;
   step 104-7: generating a park-and-ride route from the starting position to the expanded network node and from the expanded network node to the destination position according to the adjacent network node, so as to obtain the park-and-ride route from the starting position to the destination position.

In this example, the multivariate heuristic function H(N) is used to estimate the transfer cost required to reach the destination position D from any point N, and G(N) represents the cost of the route already paid from the starting position O to any point N. The specific steps of the park-and-ride travel path self-adaptive switching algorithm are as follows:
   a. Loading the bus network data, calculating G(N), H(N), and F(N) for the starting position O, which are represented as g, h, and f, respectively; wherein there are $$g_0 = \begin{cases} 0 \\ 0 \\ 0 \end{cases}, h_0 = \begin{cases} Q_{od} \\ T_{od} \\ C_{od} \end{cases},$$

and $f_0=g_0+h_0$ according to the previous analysis; and adding the starting position O to the array of network nodes to be expanded, ExNodes, wherein $Q_{od}$, $T_{od}$, and $C_{od}$ are the cost paid from the starting position O to the destination position D;

b. If the array ExNodes is not empty, selecting the expanded network node M with the minimum f value from ExNodes, and expanding the expanded network node M. The rule for calculating the minimum f value is as follows: first comparing $Q_{od}$, the f value corresponding to the smallest $Q_{od}$ is the minimum f value. If $Q_{od}$ values are equal, then comparing $T_{od}$, and the f value corresponding to the smallest $T_{od}$ when $Q_{od}$ values are equal is the minimum f value. If $T_{od}$ values are also equal, then comparing $C_{od}$, and the f value corresponding to the smallest $C_{od}$ when both $Q_{od}$ and $T_{od}$ values are equal is the minimum f value;

c. The steps for expanding the expanded network node M are as follows:
1) Searching all adjacent network nodes adjacent to the expanded network node M, and calculating g, h, and f of these adjacent network nodes, respectively. For any expanded network node E of the expanded network node M, if any expanded network node E and the expanded network node M are on the same line, then $Q_{oe}=Q_{om}$; otherwise, $$Q_{oe} = Q_{om} + 1; h_e = \begin{cases} Q_{ed} \\ T_{ed} \\ C_{ed} \end{cases};$$

2) Then determining whether any expanded network node E overlaps with a network node in ExNodes. If any expanded network node E overlaps with a network node P in ExNodes, and $Q_{oe}>Q_{op}$, then replacing the network node P in ExNodes with the any expanded network node E. If $Q_{oe}>Q_{op}$, then deleting the any expanded network node E;
3) If any expanded network node E does not overlap with any network node in ExNodes, recording the state of the any expanded network node E and inserting it into ExNodes;
d. After expanding the expanded network node M, recording the optimal path from the starting position O to the expanded network node M;
e. Determining whether the expanded network node M is the destination position. If the expanded network node M is not the destination position, continuing to select the expanded network node M with the minimum f value from ExNodes for expansion, and repeating steps b-d until the destination position D is reached;
f. If the expanded network node M is the destination position D, outputting the park-and-ride route from the starting position O to the destination position D.

In this example, after the expansion of the expanded network node M is completed, it is determined whether the expanded network node M is a P&R parking lot. If not, the next algorithm is the same as the public transportation network algorithm. If so, the road network data is loaded. The starting position and the destination position of the travel line are assessed to determine which point might be a park-and-ride point, i.e., the point from which the traveler drives or the destination point. Based on the characteristics of the P&R parking lot, the park-and-ride point is generally located in the suburbs of the city. If both the starting position and the destination position are not located in the suburbs or if both are located in the suburbs, a city center point is selected, and the point farther from the city center is determined to be the park-and-ride point. If the starting position is the park-and-ride point, the optimal path from the starting position O to the expanded network node M is calculated in the non-restricted network, i.e., the road network, and this optimal path is recorded. In this step, the number of transfers in the multivariate heuristic function does not apply, and the weight is set to 0. If the destination position is the park-and-ride point, the optimal path from the expanded network node M to the destination position D is calculated in the non-restricted network, i.e., the road network, and this optimal path from the expanded network node M to the destination position D is recorded. The park-and-ride route from the starting position O to the destination position D is outputted.

In the specific implementation process, due to the wide variety of urban bus lines, such as dedicated bus lines, airport express lines, tourist lines, and regular lines, the stations of various lines overlap and intersect. Additionally, metro stations and bus stations often overlap to facilitate transfers. In this example, before implementing the algorithm, preprocessing of bus and metro data is first conducted to merge adjacent stations to facilitate subsequent algorithm implementation. For example, the rules for station merging are as follows:

1) Merge bus stations with an interval distance of 100 meters or less;
2) Merge metro stations with an interval distance of 300 meters or less;
3) Merge bus and metro stations with an interval distance of 500 meters or less;
4) For merged stations, store the merged station ID and the corresponding line ID.

Figure 7:
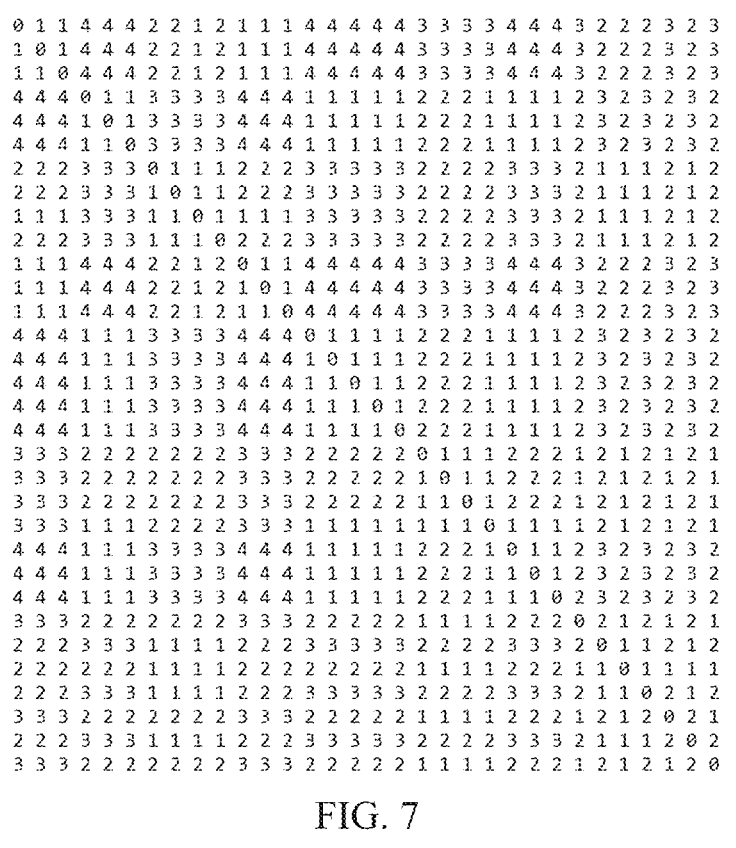

Based on the data preprocessing, and according to the transfer frequency matrix generation algorithm, a batch process is first used to generate a transfer frequency matrix for all stations (such as bus stations and metro stations). The transfer frequency matrix is pre-generated and called upon during the implementation of the algorithm. A partial schematic diagram of the transfer frequency matrix is shown in FIG. 7.

In this example, bus stations, P&R park-and-ride points, metro stations, and road intersections are named expanded network nodes. The data structure of these expanded network nodes is shown in Table 1. For an expanded network node, information such as the network node number, the network node type, and the line number and type of the network node are stored. For the public transportation network, the line refers to the bus line number or the metro line number. For the road network, the line refers to the road centerline number. Additionally, the expanded network node further stores a determination value for the nature of the network node to identify whether the network node is a starting position, a destination position, or a P&R park-and-ride point. Furthermore, the values of G(N) and F(N) are also stored in the expanded network node as key determining factors when searching for the optimal path. Finally, the expanded network node further stores a pointer to the previous connected node of the network node, which is used to establish a linked list of expanded network node pointers.

TABLE 1

| Field type | Field name | Field meaning |
| --- | --- | --- |
| Integer | NodeID | Expanded network node number |
| Boolean | bSameLine | Whether the expanded network node and the current network node are on the same line (1 for true, 0 for false) |
| Short Integer | RouteID | Line code of the expanded network node |
| Short Integer | RouteType | Line type of the expanded network node |
| Boolean | bStartPoint | Whether it is the starting position (1 for true, 0 for false) |
| Boolean | bDestination | Whether it is the destination position (1 for true, 0 for false) |
| Boolean | bPR | Whether it is a P&R park-and-ride point (1 for true, 0 for false) |
| Short Integer | g | G(N) value from the starting position O to the expanded network node N |
| Short Integer | h | H(N) value from the expanded network node N to the destination position D |
| Expanded network node | pLastNode | Previous node of the expanded network node |

In this example, the input values are the starting position and the destination position, and the output is the park-and-ride route between the starting position and the destination position. In Instance 1, the starting position is located at the intersection of Boxue Road and Fengnian Road in Jiading District, Shanghai, and the destination position is located at the intersection of Zhenhua Road and Fuping Road. According to the transfer method of this example, two park-and-ride routes are obtained.

Park-and-ride route 1, involves the traveler driving from the starting position to the Nanxiang P&R parking lot, transferring to Metro Line 11 from Nanxiang Station to Shanghai West Railway Station, and then riding a shared bicycle to the destination position. The total cost is 14 yuan, and the trip takes 46 minutes.

Park-and-ride route 2, involves the traveler walking 1200 meters from the starting position to Fengrao East Road Station, taking Bus Jiading No. 58 from Fengrao East Road Station to Zhennan Road Station, walking 500 meters to Nanxiang Station, transferring to Metro Line 11 from Nanxiang Station to Shanghai West Railway Station, and then riding a shared bicycle to the destination position. The total cost is 6 yuan, and the trip takes 85 minutes.

In Instance 2, the starting position is located at Fashion Valley Creative Park in Songjiang District, Shanghai, and the destination position is located at People's Square in Shanghai. According to the transfer method of this example, two park-and-ride routes are obtained Park-and-ride route 1, involves the traveler driving from the starting position to the Songjiang University Town P&R parking lot, transferring to Metro Line 9 from Songjiang University Town Station to Lujiabang Road Station, and then transferring to Metro Line 8 from Lujiabang Road Station to the destination position. The total cost is 12 yuan, and the trip takes 80 minutes.

Park-and-ride route 2, involves the traveler walking 1400 meters from the starting position to Sixian Road Station, taking Bus Songjiang No. 16 from Sixian Road Station to Songjiang Xincheng Station, transferring to Metro Line 9 from Songjiang Xincheng Station to Lujiabang Road Station, and then transferring to Metro Line 8 from Lujiabang Road Station to the destination position. The total cost is 7 yuan, and the trip takes 120 minutes.

From the above park-and-ride route 1 and park-and-ride route 2, it can be seen that the travel plan involving P&R takes the least amount of time. By choosing this plan, travelers can ensure a comfortable journey while also adhering to the principles of low-carbon and environmentally friendly travel, making it undoubtedly the preferred mode of travel today.

This example constructs the topological relationship between the roadway network and the public transportation network according to the roadway network transportation network data and the public transportation network data. By combining a multivariate heuristic function, the network connection points are expanded, compared, and selected according to specific rules based on the input starting and destination positions. The optimal path from the starting position to the destination position is generated by using the minimum transfer frequency, the minimum time, or the shortest distance as the optimal criteria, which enables the rapid, accurate, real-time, and reliable provision of reasonable travel plans for travelers. Furthermore, in response to the demands of modern urban development, it meets the needs of P&R park-and-ride travel and shared bicycle travel.

Example 2

Figure 8:
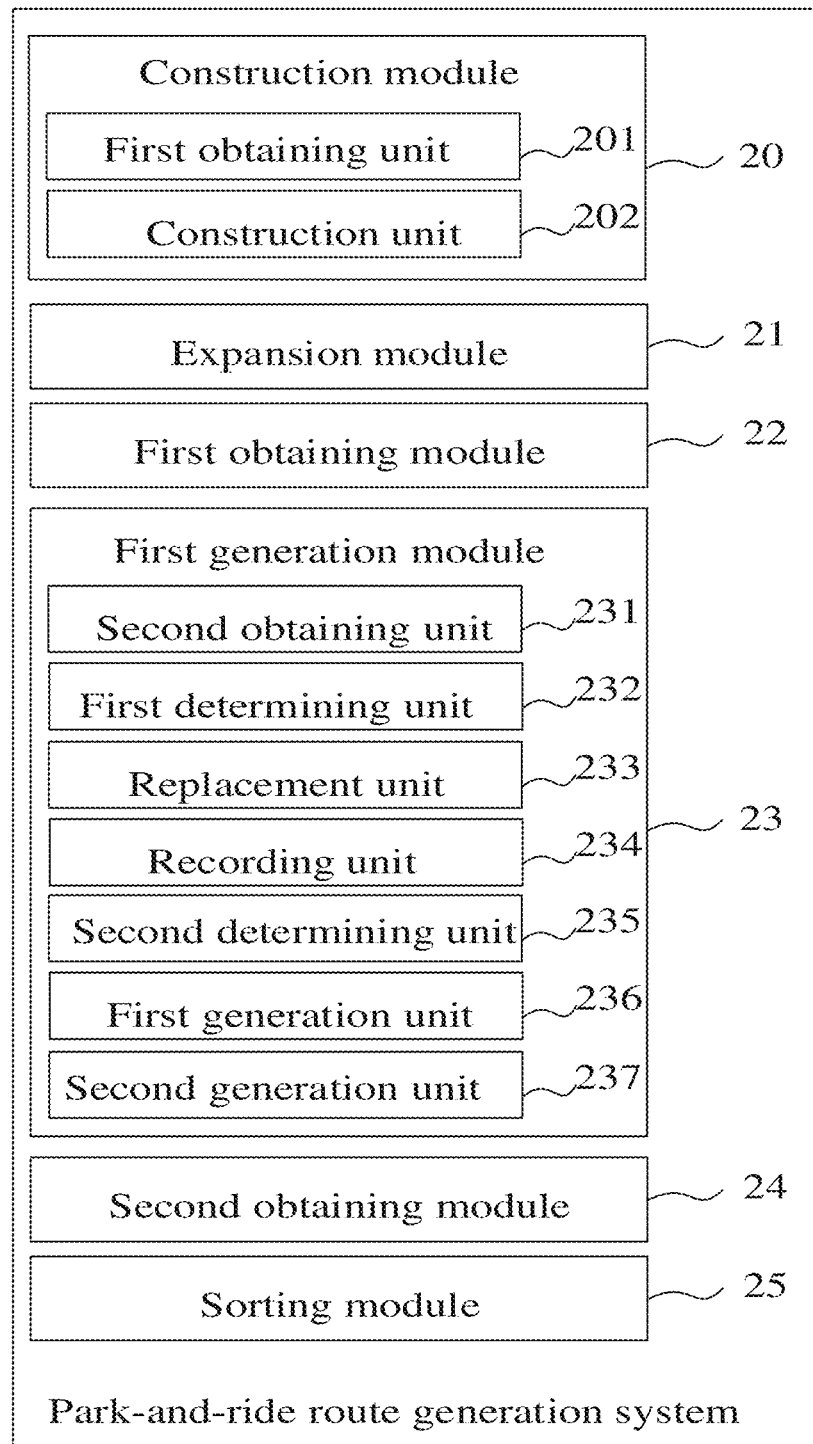
FIG. 8 is a schematic module diagram of a park-and-ride route generation system in Example 2 of the present disclosure.

This example provides a park-and-ride route generation system, as shown in FIG. 8. The generation system comprises: a construction module 20, an expansion module 21, a first obtaining module 22, and a first generation module 23;

the construction module 20, configured to construct a topological relationship between a roadway network and a public transportation network;

the expansion module 21, configured to expand an expanded network node from a starting position to a destination position in the topological relationship;

In an optional embodiment, the expanded network node comprises at least one of a road intersection, a public transportation station, a metro station, and a parking lot.

the first obtaining module 22, configured to obtain, by using a multivariate heuristic function, a minimum cost value from the starting position to the destination position via the expanded network node;

In this example, when a park-and-ride route is searched, whenever a network node is expanded, a network node with a minimum cost value F(N) is always selected from all the network nodes to be expanded as an expansion object, so as to enable the search to be performed in a most promising direction as much as possible. The expression of F(N) is shown in formula (1) in Example 1; the expression of H(N) is shown in formula (2) in Example 1.

the first generation module 23, configured to generate a park-and-ride route from the starting position to the destination position according to the minimum cost value.

In the specific implementation process, starting from the starting position, the neighboring network nodes around the starting position are traversed first. Then, the neighboring network nodes of the network nodes that have already been traversed (i.e., in the expanded network node array) are traversed, gradually expanding outward. The criterion for node expansion is the minimum cost of the multivariate heuristic function. The evaluation standard of the cost is determined according to the priority of each evaluation indicator in the multivariate heuristic function. The process continues until the destination position is reached. When the traversed expanded network node is a P&R parking lot, self-adaptive switching is performed based on the multivariate heuristic function, and traversal continues in sequence until the termination condition is met.

In this example, the cost value of the multivariate heuristic function is dynamically calculated based on the expanded state of the expanded network nodes. Each time an expanded network node is traversed, the multivariate heuristic function of the network node needs to be calculated to estimate the optimal route cost value F(N) through the expanded network node to the target network node under the constraints of the starting position. Whenever a network node is expanded, a network node with a minimum cost value F(N) is always selected from all the network nodes to be expanded as an expansion object, so as to enable the search to be performed in a most promising direction as much as possible. Therefore, each time the network node is expanded, the network node with the smallest F(N) value is always selected from the array of network nodes to be expanded (ExNodes) for expansion, enabling the search to be performed along the optimal path as much as possible. During the search process, eligible expanded network nodes are added to the array ExNodes until they are expanded to the destination position D, marking the end of the search process. It should be noted that the algorithm for the park-and-ride route in this example only requires some of the network nodes and their relationships in the entire state space of the problem to solve the problem. Therefore, compared to other algorithms, it has higher search efficiency.

In addition, travel time and travel cost of public transportation between any two stations can be easily obtained, and the travel time, the travel cost, and the transfer matrix between the above any two stations can be pre-processed and generated in batches during initialization, thereby greatly optimizing the execution efficiency of the algorithm. Walking distance is not included in the multivariate heuristic function, and it is mainly considered that the walking distance needs to be calculated in real time in the road network according to different starting and destination positions, which will affect the execution efficiency of the algorithm. In this example, walking distance is used as a sorting condition to prioritize the searched transfer routes.

This example generates the park-and-ride route from the starting position to the destination position according to the minimum cost value, obtained by using the multivariate heuristic function, from the starting position to the destination position via the expanded network node; realizing the self-adaptive switching between the roadway network and the public transportation line network through the P&R parking lot, minimizing the cost from the starting position to the destination position, solving the problem of self-adaptive searching for the optimal and most comfortable (minimal cost) travel line via the P&R parking lot, meeting the demand for hybrid travel mode involving the roadway network and public transportation line network, and aligning with the principles of low-carbon travel. Especially for megacities, it helps users find a reasonable and optimal travel route in complex urban transportation systems.

In an optional embodiment, as shown in FIG. 8, the construction module 20 comprises: a first obtaining unit 201 and a construction unit 202;

the first obtaining unit 201, configured to obtain public transportation network data and roadway network data;

the construction unit 202, configured to construct the topological relationship between the roadway network and the public transportation network according to the public transportation network data and the roadway network data;

In this example, in the urban hybrid transportation network, the expanded network node comprises at least one of the road intersection, the public transportation station, the metro station, and the parking lot. The connections between nodes are edges in the hybrid transportation network. First, the topological relationship between the roadway network and the public transportation network is established based on mathematical principles and network connectivity rules, that is, the spatial relationships between nodes and nodes, nodes and edges, and edges and edges are established, and the connection relationship between the roadway network and the public transportation network is established through P&R parking lot points.

In this example, although the public transportation network and the roadway transportation network are two independent network systems where the transportation vehicles operate in an orderly manner within their respective networks without interference, there is a topological relationship between the two networks. For example, although buses have fixed operating lines, these operating lines are built based on the roadway network. FIG. 2 is a schematic diagram of a metro line network and a bus line network. As shown in FIG. 2(a), the metro line $R_1$ (1→2→3→4) and the bus line $R_2$ (5→2→3→6) are illustrated. Among them, the metro line network is a constrained network. Since metro vehicles do not operate on the road, there is no topological relationship between the constrained network and the road centerline network. The only topological relationship exists between the metro stations and the road network, that is, the metro stations are located on the centerline of the road network, as shown in FIG. 2(b). The bus line is also a constrained network, but the buses in the constrained network actually operate on the road. Therefore, there is a strong topological relationship between the bus line network and the road network. As shown in FIG. 2(c), the bus line consists of the entire or partial boundaries of many road centerlines. The line $R_2$ (5→6) consists of road centerlines E5,7, E7,8, E8,9, E9,10, E10,2, E2,3, E3,11, E11, 12, and E12,6. The topological relationship between the two constrained networks and the road network is shown in FIG. 2(d). It should be noted that regardless of the mode of transportation, travelers will travel along the urban road transportation network.

Specifically, FIG. 3 shows a public transportation network composed of two lines, $R_1$ and $R_2$, in which network nodes 1 to 6 represent stations, and the edges in the network are the connections between two stations. Each line has a predefined line direction, and there may be one or more common stations between the lines.

For public transportation networks, in network analysis, an adjacency matrix is used to express the connectivity between nodes in the network. Connectivity between stations can be expressed by an adjacency matrix. The element $T_{ij}$=k in the matrix represents that there are k service lines connecting station i to station j. The diagonal element $T_{ii}$ is 0. The adjacency matrix for stations 1 to 6 in FIG. 3 is shown in FIG. 4. For example, there are two lines, $R_1$ and $R_2$, connecting station 2 to station 3, so $T_{23}$=2. The weighted matrix $T_{ij}^n$=k of the adjacency matrix T indicates that there are k service schemes from station i to station j with n−1 transfers. For example, $T_{24}^2$=4 means that there are two service schemes from station 2 to station 4 with one transfer: $R_1$ (2→3) followed by $R_1$ (3→4); $R_2$ (2→3) followed by $R_1$ (3→4). Although switching for the same vehicle is almost impossible to happen in practice, theoretically, such a situation does exist. Based on the above conclusion, the minimum number of transfers between any two points in the public transportation network can be calculated using the adjacency matrix and its weighted matrix. In other words, the matrix formed by the n-th power of the weighted adjacency matrix is referred to as the transfer frequency matrix.

The above is the analysis for the public transportation network. For a hybrid network, when calculating the transfer frequency matrix, in addition to considering the adjacency matrix and its weighted matrix, the network node type also needs to be taken into account. The algorithm for calculating the transfer frequency matrix of the hybrid network differs from the previous method. FIG. 5 shows a schematic diagram of urban parking where the topological relationship between the public transportation network (shown in FIG. 3) and the roadway network has been established. The network nodes 7 to 12 are road intersections located on the roads. In network analysis, both road intersections and bus stations are regarded as nodes in the network, and the topological connectivity is consistent. However, in practice, there must be at least one transfer between road intersections and bus stations. Based on this theory, the steps for calculating the transfer frequency matrix of the hybrid network are as follows:

1. establishing an adjacency matrix T between nodes and setting all elements of the transfer frequency matrix Q to zero;
2. calculating the weighted matrix $T^n$ of the adjacency matrix (where n starts from 1 and is incremented sequentially);
3. comparing $Q_{ij}$ and $T_{ij}$ in order; if $Q_{ij}=0$ and $T_{ij}^n \neq 0$, setting $Q_{ij}=n$;
4. determining the types of nodes i and j; if both are road intersections or both are public transportation stations, setting $Q_{ij}=n$; otherwise, setting $Q_{ij}=n+1$;
5. repeating steps 2 and 3 until all elements in Q, except the diagonal elements, are non-zero, and ending the loop.

FIG. 6 shows the transfer frequency matrix from node 1 to node 12, where the diagonal elements and the elements between two points that cannot be reached through any number of transfers are set to 0.

In an optional embodiment, as shown in FIG. 8, the generation system further comprises: a second obtaining module 24 and a sorting module 25;

the second obtaining module 24, configured to obtain the number of transfers and/or a travel time and/or a travel cost and/or a walking distance in the park-and-ride route;

the sorting module 25, configured to prioritize the park-and-ride route according to the number of transfers and/or the travel time and/or the travel cost and/or the walking distance.

In an optional embodiment, as shown in FIG. 8, the first generation module 23 comprises: a second obtaining unit 231, a first determining unit 232, a replacement unit 233, a recording unit 234, a second determining unit 235, a first generation unit 236, a second generation unit 237;

the second obtaining unit 231, configured to obtain an adjacent network node adjacent to the expanded network node;

the first determining unit 232, configured to determine whether the adjacent network node overlaps with a node in network nodes to be expanded, and if so, to invoke a replacement unit 233; if not, to invoke a recording unit 234;

the replacement unit 233, configured to replace the overlapped network node with the adjacent network node;

the recording unit 234, configured to record the adjacent network node into the network nodes to be expanded;

the second determining unit 235, configured to determine whether the expanded network node is a destination position, and if so, to invoke a first generation unit 236; if not, to invoke a second generation unit 237;

the first generation unit 236, configured to generate a park-and-ride route from the starting position to the expanded network node according to the adjacent network node;

the second generation unit 237, configured to generate a park-and-ride route from the starting position to the expanded network node and from the expanded network node to the destination position according to the adjacent network node, so as to obtain the park-and-ride route from the starting position to the destination position.

In this example, the multivariate heuristic function H(N) is used to estimate the transfer cost required to reach the destination position D from any point N, and G(N) represents the cost of the route already paid from the starting position O to any point N. The specific steps of the park-and-ride travel path self-adaptive switching algorithm are as follows:

a. Loading the bus network data, calculating G(N), H(N), and F(N) for the starting position O, which are represented as g, h, and f, respectively; wherein there are $$g_0 = \begin{cases} 0 \\ 0 \\ 0 \end{cases}, h_0 = \begin{cases} Q_{od} \\ T_{od} \\ C_{od} \end{cases},$$

and $f_0 = g_0 + h_0$ according to the previous analysis; and adding the starting position O to the array of network nodes to be expanded, ExNodes, wherein $Q_{od}$, $T_{od}$, and $C_{od}$ are the cost paid from the starting position O to the destination position D;

b. If the array ExNodes is not empty, selecting the expanded network node M with the minimum f value from ExNodes, and expanding the expanded network node M. The rule for calculating the minimum f value is as follows: first comparing $Q_{od}$, the f value corresponding to the smallest $Q_{od}$ is the minimum f value. If $Q_{od}$ values are equal, then comparing $T_{od}$, and the f value corresponding to the smallest $T_{od}$ when $Q_{od}$ values are equal is the minimum f value. If $T_{od}$ values are also equal, then comparing $C_{od}$, and the f value corresponding to the smallest $C_{od}$ when both $Q_{od}$ and $T_{od}$ values are equal is the minimum f value;

c. The steps for expanding the expanded network node M are as follows:

1) Searching all adjacent network nodes adjacent to the expanded network node M, and calculating g, h, and f of these adjacent network nodes, respectively. For any expanded network node E of the expanded network node M, if any expanded network node E and the expanded network node M are on the same line, then $Q_{oe}=Q_{om}$; otherwise, $$Q_{oe} = Q_{om} + 1; h_e = \begin{cases} Q_{ed} \\ T_{ed} \\ C_{ed} \end{cases};$$

2) Then determining whether any expanded network node E overlaps with a network node in ExNodes. If any expanded network node E overlaps with a network node Pin ExNodes, and $Q_{oe} < Q_{op}$, then replacing the network node P in ExNodes with the any expanded network node E. If $Q_{oe} > Q_{op}$, then deleting the any expanded network node E;

3) If any expanded network node E does not overlap with any network node in ExNodes, recording the state of the any expanded network node E and inserting it into ExNodes;

d. After expanding the expanded network node M, recording the optimal path from the starting position O to the expanded network node M;

e. Determining whether the expanded network node M is the destination position. If the expanded network node M is not the destination position, continuing to select the expanded network node M with the minimum f value from ExNodes for expansion, and repeating steps b-d until the destination position D is reached;

f. If the expanded network node M is the destination position D, outputting the park-and-ride route from the starting position O to the destination position D.

In this example, after the expansion of the expanded network node M is completed, it is determined whether the expanded network node M is a P&R parking lot. If not, the next algorithm is the same as the public transportation network algorithm. If so, the road network data is loaded. The starting position and the destination position of the travel line are assessed to determine which point might be a park-and-ride point, i.e., the point from which the traveler drives or the destination point. Based on the characteristics of the P&R parking lot, the park-and-ride point is generally located in the suburbs of the city. If both the starting position and the destination position are not located in the suburbs or if both are located in the suburbs, a city center point is selected, and the point farther from the city center is determined to be the park-and-ride point. If the starting position is the park-and-ride point, the optimal path from the starting position O to the expanded network node M is calculated in the non-restricted network, i.e., the road network, and this optimal path is recorded. In this step, the number of transfers in the multivariate heuristic function does not apply, and the weight is set to 0. If the destination position is the park-and-ride point, the optimal path from the expanded network node M to the destination position D is calculated in the non-restricted network, i.e., the road network, and this optimal path from the expanded network node M to the destination position D is recorded. The park-and-ride route from the starting position O to the destination position D is outputted.

In the specific implementation process, due to the wide variety of urban bus lines, such as dedicated bus lines, airport express lines, tourist lines, and regular lines, the stations of various lines overlap and intersect. Additionally, metro stations and bus stations often overlap to facilitate transfers. In this example, before implementing the algorithm, preprocessing of bus and metro data is first conducted to merge adjacent stations to facilitate subsequent algorithm implementation. For example, the rules for station merging are as follows:

1) Merge bus stations with an interval distance of 100 meters or less;
2) Merge metro stations with an interval distance of 300 meters or less;
3) Merge bus and metro stations with an interval distance of 500 meters or less;
4) For merged stations, store the merged station ID and the corresponding line ID.

Based on the data preprocessing, and according to the transfer frequency matrix generation algorithm, a batch process is first used to generate a transfer frequency matrix for all stations (such as bus stations and metro stations). The transfer frequency matrix is pre-generated and called upon during the implementation of the algorithm. A partial schematic diagram of the transfer frequency matrix is shown in FIG. 7.

In this example, bus stations, P&R park-and-ride points, metro stations, and road intersections are named expanded network nodes. The data structure of these expanded network nodes is shown in Table 1 in Example 1. For an expanded network node, information such as the network node number, the network node type, and the line number and type of the network node are stored. For the public transportation network, the line refers to the bus line number or the metro line number. For the road network, the line refers to the road centerline number. Additionally, the expanded network node further stores a determination value for the nature of the network node to identify whether the network node is a starting position, a destination position, or a P&R park-and-ride point. Furthermore, the values of G(N) and F(N) are also stored in the expanded network node as key determining factors when searching for the optimal path. Finally, the expanded network node further stores a pointer to the previous connected node of the network node, which is used to establish a linked list of expanded network node pointers.

In this example, the input values are the starting position and the destination position, and the output is the park-and-ride route between the starting position and the destination position. In Instance 1, the starting position is located at the intersection of Boxue Road and Fengnian Road in Jiading District, Shanghai, and the destination position is located at the intersection of Zhenhua Road and Fuping Road. According to the transfer method of this example, two park-and-ride routes are obtained.

Park-and-ride route 1, involves the traveler driving from the starting position to the Nanxiang P&R parking lot, transferring to Metro Line 11 from Nanxiang Station to Shanghai West Railway Station, and then riding a shared bicycle to the destination position. The total cost is 14 yuan, and the trip takes 46 minutes.

Park-and-ride route 2, involves the traveler walking 1200 meters from the starting position to Fengrao East Road Station, taking Bus Jiading No. 58 from Fengrao East Road Station to Zhennan Road Station, walking 500 meters to Nanxiang Station, transferring to Metro Line 11 from Nanxiang Station to Shanghai West Railway Station, and then riding a shared bicycle to the destination position. The total cost is 6 yuan, and the trip takes 85 minutes.

In Instance 2, the starting position is located at Fashion Valley Creative Park in Songjiang District, Shanghai, and the destination position is located at People's Square in Shanghai. According to the transfer method of this example, two park-and-ride routes are obtained.

Park-and-ride route 1, involves the traveler driving from the starting position to the Songjiang University Town P&R parking lot, transferring to Metro Line 9 from Songjiang University Town Station to Lujiabang Road Station, and then transferring to Metro Line 8 from Lujiabang Road Station to the destination position. The total cost is 12 yuan, and the trip takes 80 minutes.

Park-and-ride route 2, involves the traveler walking 1400 meters from the starting position to Sixian Road Station, taking Bus Songjiang No. 16 from Sixian Road Station to Songjiang Xincheng Station, transferring to Metro Line 9 from Songjiang Xincheng Station to Lujiabang Station, and then transferring to Metro Line 8 from Lujiabang Road Station to the destination position. The total cost is 7 yuan, and the trip takes 120 minutes.

From the above park-and-ride route 1 and park-and-ride route 2, it can be seen that the travel plan involving P&R takes the least amount of time. By choosing this plan, travelers can ensure a comfortable journey while also adhering to the principles of low-carbon and environmentally friendly travel, making it undoubtedly the preferred mode of travel today.

This example constructs the topological relationship between the roadway network and the public transportation network according to the roadway network transportation network data and the public transportation network data. By combining a multivariate heuristic function, the network connection points are expanded, compared, and selected according to specific rules based on the input starting and destination positions. The optimal path from the starting position to the destination position is generated by using the minimum transfer frequency, the minimum time, or the shortest distance as the optimal criteria, which enables the rapid, accurate, real-time, and reliable provision of reasonable travel plans for travelers. Furthermore, in response to the demands of modern urban development, it meets the needs of P&R park-and-ride travel and shared bicycle travel.

Example 3

Figure 9:
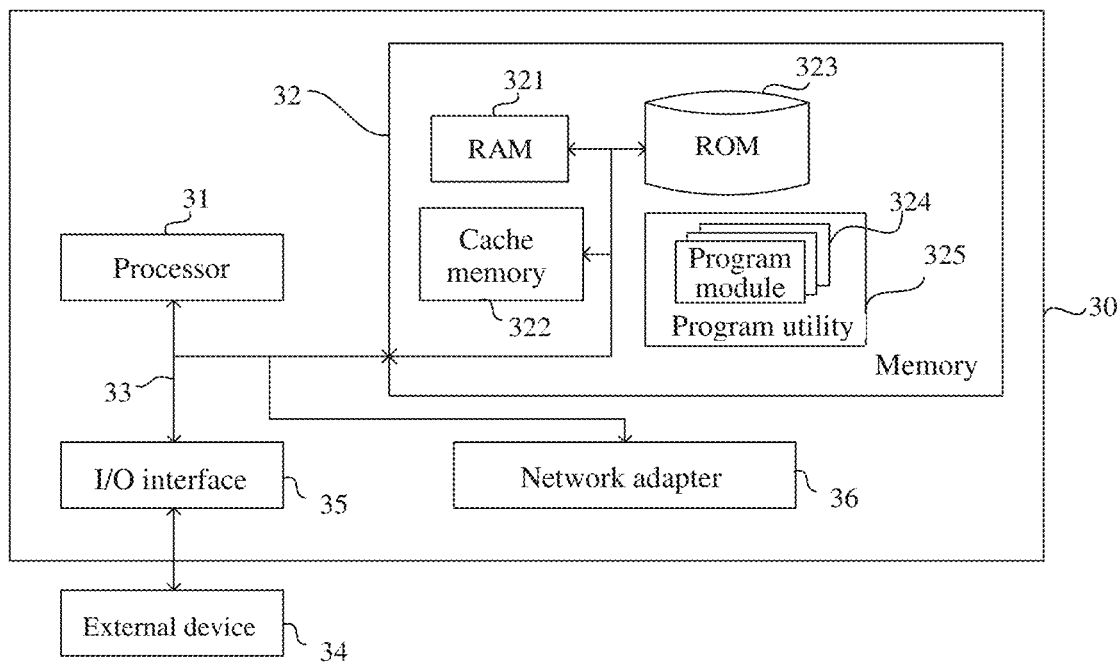
FIG. 9 is a schematic structural diagram of an electronic device that implements the park-and-ride route generation method in Example 3 of the present disclosure.

FIG. 9 is a schematic structural diagram of an electronic device provided in Example 3 of the present disclosure. The electronic device includes a memory, a processor, and a computer program stored in the memory and configured to run on the processor. The processor, when executing the program, implements the park-and-ride route generation method in Example 1. The electronic device 30 shown in FIG. 9 is only an example, and the functions and use scope of the examples of the present disclosure should not be limited.

As shown in FIG. 9, the electronic device 30 may be embodied in the form of a general-purpose computing device, which may be, for example, a server device. Components of the electronic device 30 may include, but are not limited to, at least one processor 31 described above, at least one memory 32 described above, and a bus 33 connecting different system components (including the memory 32 and the processor 31).

The bus 33 includes a data bus, an address bus, and a control bus.

The memory 32 may include a volatile memory, such as a random access memory (RAM) 321 and/or a cache memory 322, and may further include a read-only memory (ROM) 323.

The memory 32 may also include a program/utility 325 having a set of (at least one) program modules 324 including, but not limited to: an operating system, one or more application programs, other program modules, and program data. Each of the examples, or some combination thereof, may include the implementation of a network environment.

The processor 31 executes various functional applications and data processing such as the park-and-ride route generation method in Example 1 of the present disclosure by running the computer program stored in the memory 32.

The electronic device 30 may also communicate with one or more external devices 34 (e.g., keyboard, pointing device). Such communication may be conducted via an input/output (I/O) interface 35. Moreover, the model generation device 30 may also communicate with one or more networks (e.g., a local area network (LAN), a wide area network (WAN), and/or a public network, such as the Internet) via a network adapter 36. As shown in FIG. 9, the network adapter 36 communicates with other modules of the model generation device 30 via the bus 33. It should be understood that, although not shown in the figures, other hardware and/or software modules may be used in conjunction with the model generation device 30, including but not limited to: microcode, a device driver, a redundant processor, an external disk drive array, a RAID (disk array) system, a tape drive, and a data backup storage system, etc.

It should be noted that although several units/modules or sub-units/modules of the electronic device are mentioned in the above detailed description, this division is only exemplary and not mandatory. Indeed, according to embodiments of the present disclosure, the features and functions of two or more units/modules described above may be embodied in one unit/module. Conversely, the features and functions of one unit/module described above may be further divided to be embodied by multiple units/modules.

Example 4

This example provides a computer-readable storage medium on which a computer program is stored. The program, when executed by a processor, implements the park-and-ride route generation method provided in Example 1.

Herein, the readable storage medium that can be used may more specifically include, but is not limited to: a portable disk, a hard disk, a random access memory, a read-only memory, an erasable programmable read-only memory, an optical storage device, a magnetic storage device, or any suitable combination of the foregoing.

In possible embodiments, the present disclosure may also be implemented in the form of a program product including program code. When the program product is run on a terminal device, the program code is used to cause the terminal device to execute the park-and-ride route generation method described in Example 1.

Herein, the program code for executing the present disclosure may be written in any combination of one or more programming languages, and the program code may be executed entirely on the user device, partially on the user device, as a stand-alone software package, partially on the user device and partially on the remote device, or entirely on the remote device.

Although specific embodiments of the present disclosure have been described above, it should be appreciated by those skilled in the art that these are merely examples, and the scope of protection of the present disclosure is defined by the appended claims. Those skilled in the art can make various changes or modifications to these embodiments without departing from the principle and essence of the present disclosure, and these changes and modifications shall fall within the scope of protection of the present disclosure.

What is claimed is:
1. A park-and-ride route generation method, comprising:
obtaining public transportation network data and roadway network data;
constructing a topological relationship between a roadway network and a public transportation network according to the public transportation network data and the roadway network data; wherein a connection rela- tionship between the roadway network and the public transportation network is established through a P&R park-and-ride point;

utilizing an expanded network node between a starting position to a destination position in the topological relationship;

obtaining, by using a multivariate heuristic function, a minimum cost value from the starting position to the destination position via the expanded network node; wherein the minimum cost value is determined according to the priority of each evaluation indicator in the multivariate heuristic function, and the evaluation indicator comprises distance, number of transfers, time, and cost;

generating a park-and-ride route from the starting position to the destination position according to the minimum cost value, specifically comprising:

loading the public transportation network data, calculating a minimum cost value of the starting position, and adding the starting position to an array of network nodes to be expanded;

selecting an expanded network node with the smallest minimum cost value from the array of network nodes to be utilized for expansion when the array of network nodes to be expanded is not empty;

determining whether the expanded network node is a P&R park-and-ride point after the expansion of the expanded network node is completed;

when the expanded network node is not a P&R park-and-ride point, recording an optimal path from the starting position to the expanded network node;

when the expanded network node is a P&R park-and-ride point, loading the roadway network data, and in the case where the starting position is a P&R park-and-ride point, setting the weight of the number of transfers in the evaluation indicator as 0, and calculating an optimal path from the starting position to the expanded network node in the roadway network; and in the case where the destination position is a P&R park-and-ride point, calculating an optimal path from the expanded network node to the destination position in the roadway network;

determining whether the expanded network node is a destination position; when the expanded network node is not a destination, continuing to select an expanded network node with the smallest minimum cost value from the array of network nodes to be utilized for expansion; when the expanded network node is a destination, outputting the park-and-ride route from the starting position to the destination position.

2. The park-and-ride route generation method according to claim 1, wherein after the step of generating a park-and-ride route from the starting position to the destination position according to the minimum cost value, the generation method further comprises:

obtaining the number of transfers and/or a travel time and/or a travel cost and/or a walking distance in the park-and-ride route;

prioritizing the park-and-ride route according to the number of transfers and/or the travel time and/or the travel cost and/or the walking distance.

3. The park-and-ride route generation method according to claim 1, wherein the step of generating a park-and-ride route from the starting position to the destination position according to the minimum cost value comprises:

obtaining an adjacent network node adjacent to the expanded network node;

determining whether the adjacent network node overlaps with a node in network nodes to be expanded, and when the adjacent network node overlaps with a node in network nodes, replacing the overlapped network node with the adjacent network node; when the adjacent network node does not overlap with a node in network nodes, recording the adjacent network node into the network nodes to be expanded;

determining whether the expanded network node is a destination position, and when the expanded network node is a destination, generating a park-and-ride route from the starting position to the expanded network node according to the adjacent network node; when the expanded network node is not a destination, generating a park-and-ride route from the starting position to the expanded network node and from the expanded network node to the destination position according to the adjacent network node, so as to obtain the park-and-ride route from the starting position to the destination position.

4. The park-and-ride route generation method according to claim 1, wherein the expanded network node comprises at least one of a road intersection, a public transportation station, a metro station, and a parking lot.

5. A park-and-ride route generation system, comprising:

a construction module, configured to construct a topological relationship between a roadway network and a public transportation network;

an expansion module, configured to utilize an expanded network node between a starting position to a destination position in the topological relationship;

a first obtaining module, configured to obtain, by using a multivariate heuristic function, a minimum cost value from the starting position to the destination position via the expanded network node; wherein the minimum cost value is determined according to the priority of each evaluation indicator in the multivariate heuristic function, and the evaluation indicator comprises distance, number of transfers, time, and cost;

a first generation module, configured to generate a park-and-ride route from the starting position to the destination position according to the minimum cost value;

the construction module comprising:

a first obtaining unit, configured to obtain public transportation network data and roadway network data;

a construction unit, configured to construct the topological relationship between the roadway network and the public transportation network according to the public transportation network data and the roadway network data; wherein a connection relationship between the roadway network and the public transportation network is established through a P&R park-and-ride point;

the first generation module being specifically configured to:

load the public transportation network data, calculate a minimum cost value of the starting position, and add the starting position to an array of network nodes to be expanded;

select an expanded network node with the smallest minimum cost value from the array of network nodes to be utilized for expansion when the array of network nodes to be expanded is not empty;

determine whether the expanded network node is a P&R park-and-ride point after the expansion of the expanded network node is completed;

when the expanded network node is not a P&R park-and-ride point, recording an optimal path from the starting position to the expanded network node;

when the expanded network node is a P&R park-and-ride point, loading the roadway network data, and in the case where the starting position is a P&R park-and-ride point, setting the weight of the number of transfers in the evaluation indicator as 0, and calculating an optimal path from the starting position to the expanded network node in the roadway network; and in the case where the destination position is a P&R park-and-ride point, calculating an optimal path from the expanded network node to the destination position in the roadway network;

determine whether the expanded network node is a destination position; when the expanded network node is not a destination, continuing to select an expanded network node with the smallest minimum cost value from the array of network nodes to be utilized for expansion; when the expanded network node is a destination, outputting the park-and-ride route from the starting position to the destination position.

6. The park-and-ride route generation system according to claim 5, further comprising:

a second obtaining module, configured to obtain the number of transfers and/or a travel time and/or a travel cost and/or a walking distance in the park-and-ride route;

a sorting module, configured to prioritize the park-and-ride route according to the number of transfers and/or the travel time and/or the travel cost and/or the walking distance.

7. The park-and-ride route generation system according to claim 5, wherein the first generation module comprises:

a second obtaining unit, configured to obtain an adjacent network node adjacent to the expanded network node;

a first determining unit, configured to determine whether the adjacent network node overlaps with a node in network nodes to be expanded, and when the adjacent network node overlaps with a node in network nodes, to invoke a replacement unit; when the adjacent network node does not overlap with a node in network nodes, to invoke a recording unit;

the replacement unit, configured to replace the overlapped network node with the adjacent network node;

the recording unit, configured to record the adjacent network node into the network nodes to be expanded;

a second determining unit, configured to determine whether the expanded network node is a destination position, and when the expanded network node is a destination, to invoke a first generation unit; when the expanded network node is not a destination, to invoke a second generation unit; the first generation unit, configured to generate a park-and-ride route from the starting position to the expanded network node according to the adjacent network node; the second generation unit, configured to generate a park-and-ride route from the starting position to the expanded network node and from the expanded network node to the destination position according to the adjacent network node, so as to obtain the park-and-ride route from the starting position to the destination position.

8. The park-and-ride route generation system according to claim 5, wherein the expanded network node comprises at least one of a road intersection, a public transportation station, a metro station, and a parking lot.

9. An electronic device, comprising a memory, a processor, and a computer program stored in the memory and configured to run on the processor, wherein the processor, when executing the computer program, implements the park-and-ride route generation method according to claim 1.

10. A computer-readable storage medium on which a computer program is stored, wherein the computer program, when executed by a processor, implements the park-and-ride route generation method according to claim 1.

* * * * *